(12) United States Patent
Freese et al.

(10) Patent No.: US 11,919,370 B2
(45) Date of Patent: Mar. 5, 2024

(54) AIR-GUIDING DEVICE FOR AN INTERIOR OF A MOTOR VEHICLE

(71) Applicant: Dr. Ing. h.c. F. Porsche Aktiengesellschaft, Stuttgart (DE)

(72) Inventors: Bastian Freese, Stuttgart (DE); Adrian Zeyher, Stuttgart (DE); Lukas Heuschmid, Blaubeuren (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 17/549,921

(22) Filed: Dec. 14, 2021

(65) Prior Publication Data

US 2022/0185386 A1 Jun. 16, 2022

(30) Foreign Application Priority Data

Dec. 16, 2020 (DE) ...................... 10 2020 133 652.7

(51) Int. Cl.
*B60H 1/34* (2006.01)
*B62D 25/14* (2006.01)

(52) U.S. Cl.
CPC ......... *B60H 1/3414* (2013.01); *B60H 1/3421* (2013.01); *B62D 25/142* (2013.01)

(58) Field of Classification Search
CPC ...... B60H 1/3421; B60H 1/3414; B60H 1/34; B62D 25/142
USPC .................................................. 454/108, 127
See application file for complete search history.

(56) References Cited

U.S. PATENT DOCUMENTS

| | | | |
|---|---|---|---|
| 10,703,175 B2 | 7/2020 | Schaal | |
| 2018/0056756 A1* | 3/2018 | Schaal | B60H 1/3421 |
| 2019/0322160 A1* | 10/2019 | Ito | B60H 1/3421 |
| 2020/0009945 A1 | 1/2020 | Doll | |
| 2020/0047585 A1* | 2/2020 | Kawamoto | B60H 1/0065 |

(Continued)

FOREIGN PATENT DOCUMENTS

| | | |
|---|---|---|
| CN | 110126589 A * | 8/2019 |
| DE | 102016116358 A1 | 3/2018 |

(Continued)

OTHER PUBLICATIONS

Machine translation of JPH0515938 (Kojima Press) (Year: 1987).*
DE-102019206851 machine translation (Year: 2020).*

*Primary Examiner* — Jason S Morrow
(74) *Attorney, Agent, or Firm* — LEYDIG, VOIT & MAYER, LTD.

(57) ABSTRACT

An air-guiding device for an interior of a motor vehicle includes a housing forming a cavity, slats accommodated in the cavity, and an outlet opening. The slats are formed pivotably in a direction of a body transverse axis and configured to deflect an air flow in the direction of the body transverse axis. The outlet opening enables the air flow to flow into the interior of the motor vehicle. The slats are arranged upstream of the outlet opening and spaced apart, for non-visibility, from the outlet opening in a direction of a body longitudinal axis. A central web is arranged in the cavity. The central web is configured to deflect the air flow in a direction of a motor vehicle vertical axis, and the central web divides the cavity in the direction of the motor vehicle vertical axis into a first flow duct and a second flow duct.

10 Claims, 2 Drawing Sheets

(56) References Cited

U.S. PATENT DOCUMENTS

2020/0164721 A1*  5/2020  Flothmann ............. B60H 1/345
2020/0254850 A1*  8/2020  Doll .................... B60H 1/3414
2020/0406721 A1* 12/2020  Paris ................. B60H 1/00871

FOREIGN PATENT DOCUMENTS

| DE | 102017218626 A1    | 4/2019  |                       |
|----|--------------------|---------|-----------------------|
| DE | 102018211057 A1    | 1/2020  |                       |
| DE | 202019005119 U1    | 2/2020  |                       |
| DE | 102018222700 A1    | 6/2020  |                       |
| DE | 102019206851 A1 *  | 11/2020 | ........... B60H 1/0055 |
| DE | 102019209011 A1 *  | 12/2020 | ........... B60H 1/3421 |
| DE | 102021111535 A1 *  | 11/2022 |                       |
| EP |       3321114 A1 * | 5/2018  | ........... B60H 1/3414 |
| JP |        62228833 A  | 10/1987 |                       |

\* cited by examiner

AIR-GUIDING DEVICE FOR AN INTERIOR OF A MOTOR VEHICLE

CROSS REFERENCE TO RELATED APPLICATIONS

This application claims benefit to German Patent Application No. DE 10 2020 133 652.7, filed on Dec. 16, 2020, which is hereby incorporated by reference herein.

FIELD

The disclosure relates to an air-guiding device for an interior of a motor vehicle.

BACKGROUND

Air-guiding devices for an interior of a motor vehicle are well known. The air-guiding devices conventionally comprise adjustable slats, wherein the slats are accommodated in a body interior component, in particular in a dashboard of the motor vehicle. The air-guiding devices are also referred to as "vents". The conventionally "open design", i.e. the slats are visible from the interior of the motor vehicle body, is often perceived as being aesthetically annoying.

Therefore, in recent past, air-guiding devices have been developed, the slats of which are visible only to a limited extent in a customary position of occupants in the motor vehicle.

Laid-open application DE 10 2018 222 700 A1 thus discloses an air-guiding device for an interior of a motor vehicle, the vent of which extends below a dashboard of the motor vehicle, wherein the vent does not have an adjustment element and is configured in the form of a slot.

Laid-open application DE 10 2017 218 626 A1 discloses an air-guiding device for an interior of a motor vehicle, the air-guiding means of which, in the form of pivotable slats, are covered with the aid of a panel, wherein the slats are arranged behind the panel and partially above and partially below an air outlet opening, from the viewing direction of an occupant. The slats are pivotable in the direction of a body transverse axis in order to deflect an air flow.

SUMMARY

In an embodiment, the present disclosure provides an air-guiding device for an interior of a motor vehicle. The air-guiding device includes a housing forming a cavity, slats accommodated in the cavity, and an outlet opening. The slats are formed pivotably in a direction of a body transverse axis and configured to deflect an air flow in the direction of the body transverse axis. The outlet opening enables the air flow to flow into the interior of the motor vehicle. The slats are arranged upstream of the outlet opening and spaced apart, for non-visibility, from the outlet opening in a direction of a body longitudinal axis. A central web is arranged in the cavity. The central web is configured to deflect the air flow in a direction of a motor vehicle vertical axis, and the central web divides the cavity in the direction of the motor vehicle vertical axis into a first flow duct and a second flow duct.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
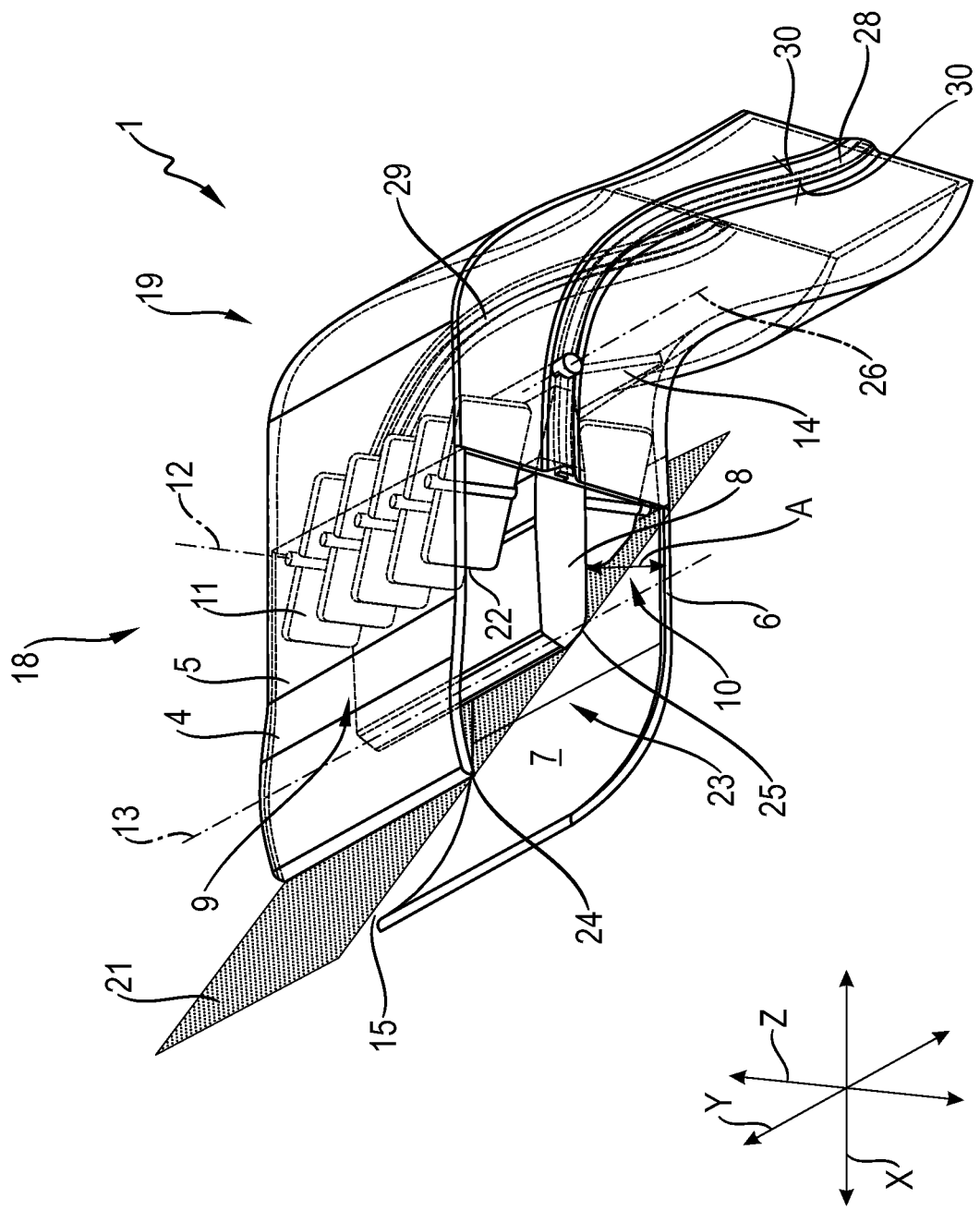
FIG. 1 shows, in a perspective illustration, an air-guiding device according to the invention for an interior of a motor vehicle.

The present invention provides an improved air-guiding device for an interior of a motor vehicle.

An air-guiding device according to the present disclosure for an interior of a motor vehicle comprises a housing forming a cavity. Slats which are formed pivotably for deflecting an air flow in the direction of a body transverse axis are accommodated in the cavity. The housing has an outlet opening via which the air flow can flow into the interior. The slats are arranged upstream of the outlet opening at a distance from the outlet opening in the direction of a body longitudinal axis for non-visibility. According to the present disclosure, in order to deflect the air flow in the direction of a motor vehicle vertical axis, a central web is arranged in the cavity, the central web dividing the cavity in the direction of the motor vehicle vertical axis into a first flow duct and a second flow duct. The advantage is the realization of two flow ducts which are formed separately in the direction of the motor vehicle vertical axis and which can bring about a respectively different air flow, for example, with the aid of the slats. For this purpose, the slats, for example, could be adjusted individually for each of the flow ducts.

In a refinement of the air-guiding device, the central web is designed to receive the slats such that they are rotatable about their slat axis. An air-guiding device which is optimized in terms of construction space can thus be realized. For example, the central web itself could be pivotable, with the slats, apart from changing their position with respect to the motor vehicle transverse axis, additionally changing their position in the direction of the motor vehicle vertical axis. The air flow flowing out of the outlet opening could thus be additionally adjusted simply and so as to be optimized in terms of construction space.

The central web is cost-effectively accommodated immovably in the housing.

A control element which is designed for controlling a partial air flow flowing in each case into the first flow duct and into the second flow duct leads to a further increase in a number of adjustments of the air-guiding device such that the outflowing air flow can be adapted in an individually improved manner. That is to say, in other words, that, with the aid of the control element, there is the possibility in a simple manner of combining an air deflection of the air flow by the slats in the direction of the motor vehicle transverse axis with an air deflection of the air flow by the control element in the direction of the motor vehicle vertical axis, with the control element preferably being arranged movably in the housing upstream of the slats.

The control element is advantageously pivotable about an element spindle extending in the direction of the body transverse axis, thus enabling the simple and therefore cost-effective construction of the control element in the form of a flap.

For simple installation of the air-guiding device, it is proposed to design the housing in a manner having a housing upper part and a housing lower part. Thus, for example in the installation, the slats, the central web and the control element can be placed in an easy to install manner from above into the housing lower part. After the components mentioned have been positioned, the housing is closed by the housing upper part being placed thereon, with at least, of course, the outlet opening remaining open. The connection of the two housing parts can be formed in a form-fitting, force-fitting and/or integrally bonded manner. A releasable connection permitting simple exchange of parts of the air-guiding device is preferred. An adjustment element is possibly also to be arranged in the housing, the adjustment element likewise being placed in the housing lower part before the housing upper part is attached.

The two-part construction of the housing furthermore leads to simplified production of the formation of the housing upper part and/or of the housing lower part with a curved shape starting from an end of the central web formed in a manner facing the outlet opening. Said curvature, which is preferably concave, affords the advantage in a simple manner of already predetermining an outflow direction of the air flow out of the outlet opening. The curvature can be pronounced or less pronounced depending on an arrangement of the air-guiding device in the interior.

A mixing region of the air-guiding device is formed depending on an arrangement of the central web and of the slats relative to the outlet opening, the mixing region mixing individual air flows and partial air flows formed with the aid of the slats and the two flow ducts prior to the outflow of said air flows in order to bring about a pleasant air flow of the air-guiding device into the interior. The free cavity region present in the housing between the central web and/or the slats and the outlet opening is therefore used, as a result of which a low height of the outlet opening, for example 22 mm, is possible, which brings about virtually complete invisibility of the air-guiding device.

An air-guiding device 1 designed according to FIG. 1 for an interior 2 of a motor vehicle 3 has a housing 4 which has a housing upper part 5 and a housing lower part 6, wherein a cavity 7 for the passage of air is formed between the housing upper part 5 and the housing lower part 6.

In the present exemplary embodiment, a central web 8 is formed centrally in the cavity 7, that is to say, in other words, centrally between the housing upper part 5 and the housing lower part 6 in the direction of a motor vehicle vertical axis Z, said central web 8 extending predominantly in the direction of a motor vehicle transverse axis Y and in the direction of a motor vehicle longitudinal axis X. The cavity 7 is divided into two flow ducts, into a first flow duct 9 and into a second flow duct 10, with the aid of the central web 8.

The central web 8 has a plurality of slats 11 which are each mounted rotatably on the central web 8 with the aid of a slat axis 12. Conventionally, the slats 11 are jointly adjustable in an identical direction, but they could also be positioned individually, with a complicated structure.

The slats 11 are arranged transversely with respect to a longitudinal axis 13 of the central web 8, that is to say, described in other words, that the individual slat 11 is formed extending predominantly in the direction of the motor vehicle axis Z and the motor vehicle longitudinal axis X, as viewed in a position in which the air flow flowing through the air-guiding device 1 is not laterally deflected by the slat 11.

A control element 14 is formed upstream of the slats 11, the control element 14 being formed in a manner assigning the air flow flowing through the cavity 7 to its position in accordance with flow ducts 9, 10. That is to say, in other words, that, with the aid of the control element 14, the air flow flowing via the air-guiding device 1 can be divided into an upper air flow part flowing between the central web 8 and the housing upper part 5 and a lower air flow part flowing between the central web 8 and the housing lower part 6, wherein, starting from the air flow flowing completely via the air-guiding device 1, the air flow parts can be adjusted relative to one another. That is to say that the air flow is deflectable with the aid of the control element 14 in the direction of the motor vehicle vertical axis Z. With the aid of the slats 11, the upper air flow part and the lower air flow part can be deflected relative to the motor vehicle transverse axis Y. An air-guiding device 1 which has a combination of an air deflection in the direction of the motor vehicle transverse axis Y and in the direction of the motor vehicle vertical axis Z is thus formed.

The control element 14 is arranged adjacent to the slats 11, but not touching the latter, and has an element spindle 26 about which it is accommodated pivotably in the housing 4. It is configured in the form of a flap which is pivotable about the element spindle 26.

The housing 4 has an outlet opening 15 via which the air flow which is adjusted with the aid of the slats 11 and the control element 14 can flow out into the interior 2. Said outlet opening 15 is preferably arranged flush with an outer surface 16 of an interior part 17 of the motor vehicle 3, conventionally a dashboard or instrument panel. It could likewise also be attached offset with respect to the outer surface 16 in the direction of a front of the motor vehicle 3.

The housing 4 is has a first housing portion 18 through which the flow can pass and which is designed for accommodating the central web, the slats 11 and the control element 14, where there is a second housing portion 19 of the housing 4 which adjoins the first housing portion 18, and through which the flow can pass and which serves for supplying air to the slats 11.

The first housing portion 18 has the outlet opening 15 downstream of the slats 11. Starting from an end of the central web 8 formed in a manner facing the outlet opening 15, the housing upper part 5 and the housing lower part 6 are formed with a curved shape, wherein the respective curvature K is concave with respect to the opposite part 5; 6. The air flow can therefore be deflected in a simple manner in the direction of the motor vehicle vertical axis Z. The curvature K can be adapted, depending on a positioning of the air-guiding device 1 in the interior 2, for the desired outflow of the air flow out of the outlet opening 15. This means that the air-guiding device 1, which is preferably arranged in a lower region of the interior part 17 in the direction of the motor vehicle vertical axis Z, as is illustrated by way of example in FIG. 3, can also be arranged in an upper or central region, wherein the curvature K is correspondingly adapted for the suitable outflow of the air flow. That is to say, in other words, that, for example, the curvature K of the housing lower part 6, which is relatively pronounced in the exemplary embodiment according to FIG. 1, is less pronounced, for example according to the curvature K of the housing upper part 5, and vice versa. The outflowing air flow is thus preferably directed downward, whereas, in the exemplary embodiment depicted, it is preferably deflected upward in the direction of the motor vehicle vertical axis Z.

FIG. 1 shows a virtual visible plane 21 which corresponds to a view of the air-guiding device 1 from the interior 2, wherein the virtual visible plane 21 is dependent on an installed position of the air-guiding device 1. The indicated virtual visible plane 21 is relevant for an installation of the air-guiding device 1 according to FIG. 2, thus in the lower region of the interior part 17.

The slats 11 and the central web 8 and, of course, the control element 14 are completely arranged behind the virtual visible plane 21, that is to say, in other words, starting from the interior 2, behind the virtual visible plane 21 in the direction of the motor vehicle longitudinal axis X.

The air flow parts are mixed in a region between the outlet opening 15 and a slat outlet 22, which region is arranged opposite the outlet opening 15. A mixing region 23 is therefore formed in the housing 4, leading to a preferred mixing of the partial air flows before they flow out via the outflow opening 15 into the interior 2. In the present exemplary embodiment, the virtual visible plane 21 is spanned between an upper outlet edge 24 of the outlet opening 15, which upper edge is assigned to the housing upper part 5, and a lower edge 25 of the central web 8. An axial extent of the slats 11 formed in the direction of the motor vehicle longitudinal axis X should be taken into consideration and should be determined depending on a free distance A present between the central web 8 and the housing lower part 6.

Figure 2:
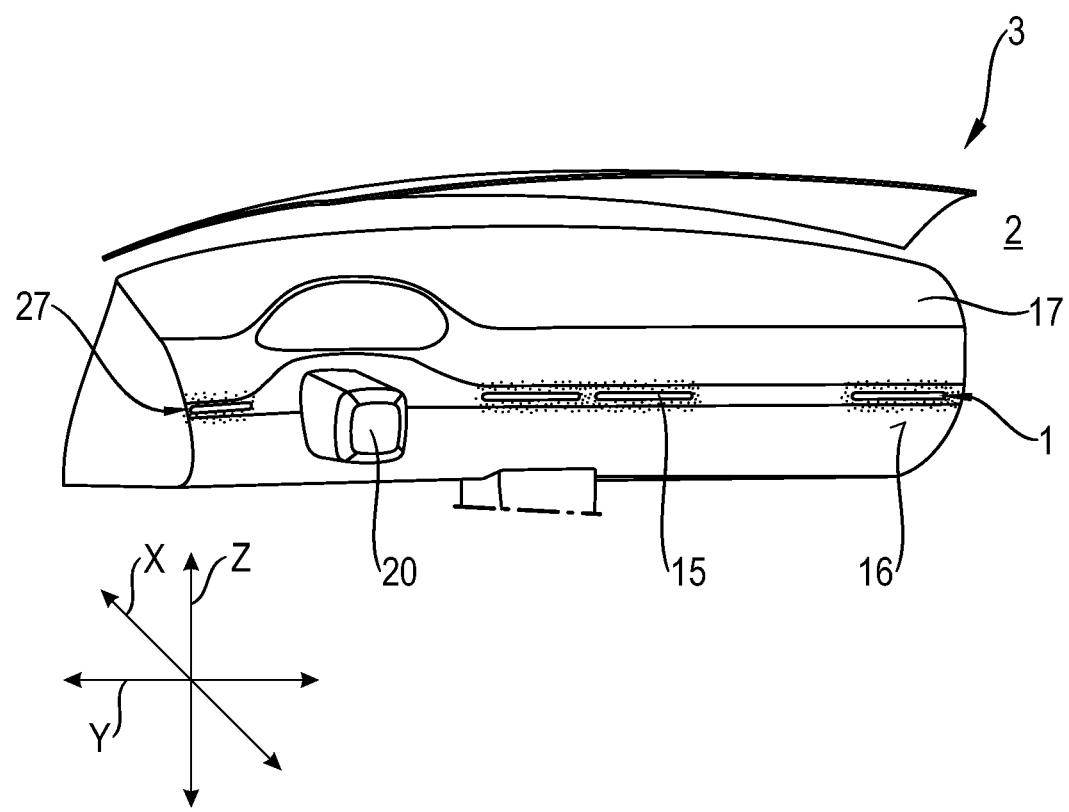
FIG. 2 shows, in a perspective illustration, a cutout from a dashboard of the motor vehicle.

The air-guiding device 1 is usable at various locations in the interior 2, as is illustrated by way of example in FIG. 2. The deflection of the air flow, or, in other words, the positioning of the slats 11 and of the control element 14, is adjustable from the interior with the aid of an adjustment element 20.

Owing to the above-described construction of the air-guiding device 1, a low height of the outlet opening 15 can be realized, and therefore the air-guiding device 1 can be arranged in a, for example, continuous slot 27, as depicted in FIG. 2.

For the effective outflow, it should be noted that sufficient space adjacent to the housing 4 in the direction of the motor vehicle transverse axis Y should be maintained with respect to, for example, a further housing 4 or other components of the motor vehicle 3 so that the air flow deflected by the slats 11 does not strike against a surface arranged next to the outlet opening 15 since the slats 11 are placed to the rear in the direction of the motor vehicle longitudinal axis X. A sufficient opening through which the flow can pass should therefore be maintained next to the outlet opening 15 depending on a distance formed along the motor vehicle longitudinal axis X between the slat axis 12 and the outlet opening 15 in the direction of the motor vehicle transverse axis Y, or, put in other words, the outlet opening 15 should be adapted in the direction of the motor vehicle transverse axis Y in accordance with a maximum deflection of the slats 11 in the direction of the motor vehicle transverse axis Y.

The element spindle 26 is preferably accommodated in a first groove 28 and a second groove 29 in the housing 4, wherein the grooves 28, 29 are formed by mutually opposite abutting edges 30 of the housing upper part 5 and the housing lower part 6. The housing parts 5, 6 can thus be produced, for example in a cost-effective injection molding process, so as to each have one half of the grooves 28, 29. During the installation, then, for example, the element spindle 26 can be placed into the groove half of the grooves 28, 29 assigned to the housing lower part 6, as a result of which it is locked in place before the housing upper part 5 is arranged thereon. The two housing parts 5, 6 are connected to each other, for example in a cost-effective integrally bonded manner, as a result of which a module is formed which can advantageously be mounted on the motor vehicle 3. Of course, before the arrangement of the housing upper part 5, the slats 11 and the central web 8 and, if present, an adjustment device, not illustrated specifically, extending into the cavity 7 are likewise accommodated in the cavity 7.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Air-guiding device
2 Interior
3 Motor vehicle
4 Housing
5 Housing upper part
6 Housing lower part
7 Cavity
8 Central web
9 First flow duct
10 Second flow duct
11 Slat
12 Slat axis
13 Longitudinal axis
14 Control element
15 Outlet opening
16 Outer surface
17 Interior part
18 First housing portion
19 Second housing portion
20 Adjustment element
21 Virtual visible plane
22 Slat outlet
23 Mixing region
24 Outlet edge
25 Lower edge
26 Element spindle
27 Slot
28 First groove
29 Second groove
30 Abutting edge
A Distance K Curvature
X Motor vehicle longitudinal axis
Y Motor vehicle transverse axis
Z Motor vehicle vertical axis

What is claimed is:

1. An air-guiding device for an interior of a motor vehicle, the air-guiding device comprising:
   a housing forming a cavity, the housing comprising a first housing structure and a second housing structure;
   slats accommodated in the cavity; and
   an outlet opening,
   wherein the slats are formed pivotably in a direction of a body transverse axis and configured to deflect an air flow in the direction of the body transverse axis,
   wherein the outlet opening enables the air flow to flow into the interior of the motor vehicle,
   wherein the slats are arranged upstream of the outlet opening and spaced apart, for non-visibility, from the outlet opening in a direction of a body longitudinal axis,
   wherein a central web is arranged in the cavity, the central web being configured to deflect the air flow in a direction of a motor vehicle vertical axis,
   wherein the central web divides the cavity in the direction of the motor vehicle vertical axis into a first flow duct and a second flow duct,
   wherein the central web and the slats are arranged within the first housing structure,
   wherein the second housing structure supplies air to the slats, the first flow duct, and the second flow duct,
   wherein the first housing structure has a housing upper part and a housing lower part,
   wherein, starting from an end of the central web formed in a manner facing the outlet opening, the housing upper part and the housing lower part are each formed with a curved shape, and
   wherein a curvature of the housing upper part is less pronounced than a curvature of the housing lower part, or vice versa.

2. The air-guiding device as claimed in claim 1, wherein the central web is designed to receive the slats such that they are rotatable about their slat axis.

3. The air-guiding device as claimed in claim 1, wherein the central web is accommodated immovably in the first housing structure.

4. The air-guiding device as claimed in claim 1, wherein a control element is designed for controlling a partial air flow flowing in each case into the first flow duct and into the second flow duct.

5. The air-guiding device as claimed in claim 4, wherein the control element is arranged movably in the second housing structure upstream of the slats.

6. The air-guiding device as claimed in claim 4, wherein the control element is pivotable about an element spindle extending in the direction of the body transverse axis.

7. The air-guiding device as claimed in claim 1, wherein the curvature of the housing upper part and the curvature of the housing lower part are concave.

8. The air-guiding device as claimed in claim 1, wherein a mixing region of the air-guiding device is formed between the outlet opening and the slats or the central web.

9. The air-guiding device as claimed in claim 1, wherein the outlet opening of the air-guiding device is flush with a continuous slot extending within a vehicle interior structure.

10. The air-guiding device as claimed in claim 9, wherein the continuous slot extends beyond lateral edges of the air-guiding device and further beyond lateral edges of at least one further air-guiding device.

* * * * *